Dec. 15, 1964   D. J. HOWE ETAL   3,161,509
LINE STEREO COLOR PICTURES
Filed April 24, 1962   2 Sheets-Sheet 1

Donald J. Howe
Richard E. Maurer
James W. Henry
INVENTOR.

BY R. Frank Smith
F. M. Emerson Holmes
ATTORNEYS

Donald J. Howe
Richard E. Maurer
James W. Henry
INVENTOR.

| United States Patent Office | 3,161,509 |
|---|---|
| | Patented Dec. 15, 1964 |

3,161,509
LINE STEREO COLOR PICTURES
Donald J. Howe and Richard E. Maurer, Rochester, N.Y., and James W. Henry, Kingsport, Tenn., assignors to Eastman Kodak Company, Rochester, N.Y., a corporation of New Jersey
Filed Apr. 24, 1962, Ser. No. 189,748
13 Claims. (Cl. 96—49)

This invention relates to line stereo color pictures.

Line stereo effects are produced by viewing through vertical slits or through vertical lenticules, pictures or images consisting of vertical elements, so arranged that through each slit or lenticule, the right eye sees an element of a right eye separation or view and the left eye sees an element of a left eye view. In the simple case only one pair of separations is represented by the elements and hence the binocular view of the picture is from one direction. In a different, but also well known case, there is a continuum of subelements representing an angular range of viewpoints. The binocular view through the slit or lenticule is still a view of a stereo separation pair, but this pair and the apparent direction of view change as the picture rotates about a vertical axis. The observer gets the feeling that the object itself is turning or that he is moving around the object so that the view is from different directions.

The terms "vertical" and "horizontal" are used in this specification and in the claims to refer to directions on a picture or print in the usual sense, a line running from "top" to "bottom" of the picture being "vertical." The term "vertical" thus does not correspond to the direction of the earth's gravity except when the picture itself is held vertical to the earth. It happens on the other hand that pictures are usually held with "horizontal" lines horizontal to the earth's surface and with the eyes of the observer in a horizontal plane. All terms which refer to directions or orientations are correct in all senses when the picture is held vertical to the earth and the observer observes it normally and with head erect.

"Azimuth" refers to directions in a horizontal plane. The vertical slits or vertical lenticules confine the light from one point of the picture to on vertical plane or direction. That is, the slits or lenticules define the azimuth of the light from each point of the picture. They are herein called "viewing elements" and for any point on the picture the corresponding viewing element is the "light azimuth defining viewing element."

The effective aperture in the horizontal plane depends on the width of the viewing element. The lenticules have a much wider horizontal aperture than the slits; hence the lenticular viewed pictures appear brighter.

"Picture elements" refer to the parts of the image behind each "viewing element," there being at least one right eye element and one left eye element behind each "viewing element." The viewing elements are oriented "vertically." Each picture element contains picture information (color and/or density variations) in the vertical dimension. In the horizontal dimension there is picture information as one goes from element to element, but within each picture element, the horizontal variations, if any, represent "stereo information," i.e., the differences between two or more pictures of the same subject viewed from different azimuths.

When the picture or print consists of halftone elements, each halftone element (dot plus background) is considered as a unit, i.e., as one picture subelement. The above discussion of variations (vertical or horizontal) within the picture element does not include the change (e.g., white to black) within the halftone element. When the halftone elements (i.e., the picture subelements) are the same order of magnitude as the picture elements, the terminology may seem confused. This is proper and should not be unexpected since at the same time, the problem of conveying the stereo information and the details of the picture information (i.e., the problem of getting good resolution) becomes very difficult. Since the solution of this problem is intrinsic in the present invention, terminology must be carefully used to avoid the confusion inherent in the fact that what should be a "subelement" of the picture is sometimes as large as or even larger than an "element," and when it is, "stereo information" is effectively lost. Also subelements properly refer to those in the continuum (autostereo) embodiments as well as to halftone elements. In a good dot halftone continuum stereo print, the two forms of subelements are the same; the dots are the separate units of the continuum.

"Stereo separations" are two pictures of the same subject, one intended for the right eye and the other for the left; in lenticular or line stereo the separations are superimposed in stereo register, the elements of each being distinguished by the viewing elements.

"Color separations" are three (cyan, magenta, and yellow) sometimes plus a fourth (black), pictures of the same subject which when viewed in register give an approximately natural color reproduction of the subject.

In recent years, the lenticular forms of line stereo have been more common than the slit systems and hence the present specification will emphasize the application of the invention to lenticular stereo. Also the invention is applicable either to single pair or continuum (sometimes called autostereo) systems. However the invention is most needed with the continuum systems which involve finer resolution in the horizontal dimension.

It is the primary object of the invention to provide high quality stereo images for line (slit or lenticular) viewing, which are printed by halftone methods. The problem, as just mentioned, is the fact that the vertical elements of the stereo picture must, in general, be very narrow to provide acceptable resolution in the pictures. The width of each vertical element represents the limit of resolution of the picture. When halftone dots are used to constitute or create the picture itself, there is a direct conflict between the halftone dots and the vertical stereo elements in defining the limit of resolution. In fact, if the halftone dots are of the same magnitude as the vertical lines or even as large as half the width of the stereo lines, the resolution in the halftone pictures is not good enough to record the stereo separation information. In the case of a continuum of images or subelements in each element providing say 10 distinct views, the proper stereo information would not be available unless the halftone dots (which are the subelements of the picture elements) are on the order of ½₀ of the width of the lenticular or line viewing element. This brings in the other limitation on halftone processes, namely the fact that there is a limit on the fineness which can be printed on paper of any particular quality; coarse paper cannot be used for fine halftones.

According to the present invention the use of dot halftones is avoided at least for the recording of stereo information. The halftone print, or part thereof, in the present invention is made of horizontal line, line halftones. Line halftones are well-known and the most preferred embodiment of the present invention employs a line gravure print, made from a plate in which the halftone variations are essentially variation in width, although there may also be variation in depth.

Each horizontal line of the line gravure plate in the preferred embodiment varies in vertical width according to the density of the picture to be represented. This variation in width is characteristic of line litho and line relief plates also. However in the present invention the variations are in sections corresponding to the individual viewing elements of the picture. That is, each line is continuous but as one proceeds from left to right along a halftone line, the variation in width corresponds overall to the changes in density from left to right in the pictures but in each section it corresponds to the stereo information. The left part of the line in any one elemental section represents a right eye view and the right part represents a left eye view.

The line halftone need not be strictly horizontal, but should be at a fairly large angle to the vertical stereo elements. This is referred to as being approximately horizontal. When applied to color photography, the advantages of the invention can be obtained using three color separation line prints, each approximately horizontal. Still better results are obtained however by having a four color print, i.e., by having a black printer print in addition to the three color separation prints.

According to a most preferred embodiment of the invention when applied to color pictures, the stereo information is carried only in the black printer print. Excellent stereo pictures are produced even though the magenta, cyan and yellow prints incorporated into the picture do not contain any stereo information. Furthermore, it is quite satisfactory and there is some advantage when the color separation prints consists of dot halftones, while the black printer print is a line halftone containing the stereo information as discussed above. The advantage of using dot halftones for the color parts of the picture is the fact that better color reproduction is obtained. The stereo effect even in the continuum embodiments appears undiminished.

The invention will be fully understood from the following description of preferred embodiments thereof, when read in connection with the accompanying drawing in which.

Figure 1:
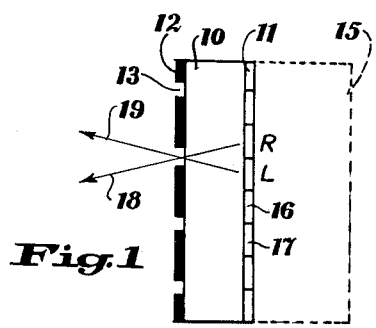
FIGS. 1, 2, 3 and 4 are schematic sectional views of four standard forms of line stereo pictures made photographically.

In FIG. 1, a transparent film 10 carries a line stereo image on one surface in a photographic emulsion layer 11. The front surface of the film is provided with an opaque coating 12 having vertical slits 13 therein corresponding to each element of the stereo picture. The stereo picture is made up of right eye sections 16 and left eye sections 17. Light from a right eye section proceeds as indicated by an arrow 18 to the right eye of an observer and light from a left eye section of the image proceeds as indicated by arrow 19 to the left eye of the observer. If the observer moves slightly to the right or left, or if the film is tilted slightly, the observer still sees the same stereo image, the right separation being made up of sections 16 and the left separation being made up of sections 17. Thus the slits 13 in the opaque coating 12 serve to differentiate angularly between the portions of the image behind each slit. Light from all of the right eye sections proceeds in one direction and light from all of the left eye sections proceeds in a different direction. The slits define the azimuth of the light as viewed.

The optical system is exactly the same when the picture 11 is simply an ink image printed on paper indicated by broken lines 15. The image 11 is still separated from the azimuth defining slits 13 by the transparent layer or coating 10.

Figure 2:
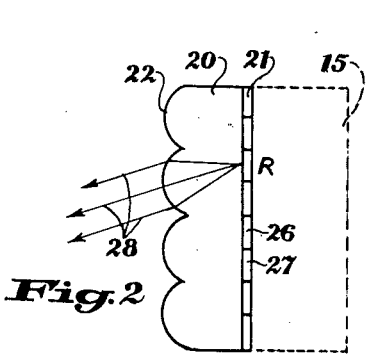

In FIG. 2 the stereo effect is obtained by using lenticular film 20 having the stereo picture or separations 21 on one surface and lenticules 22 on the other surface. The right eye and left eye picture elements 26 and 27 are angularly differentiated by the lenticules, i.e., the azimuth of the light from the picture elements is defined by the lenticules. This is indicated by the rays 28 which come from one image area or element and which pass in one particular direction only (i.e., are parallel) as they leave the lenticules. Lenticular systems have higher optical efficiency, i.e., have wider aperture in the horizontal dimension, than the slit systems illustrated in FIG. 1.

Figure 3:
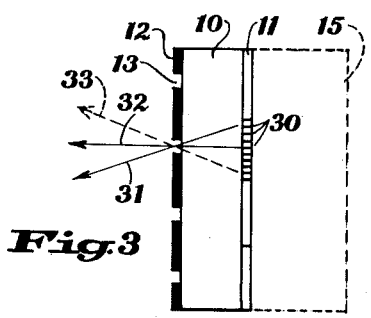

As mentioned above, some forms of stereo pictures, instead of having just one right eye view or separation and one left eye view or separation, are made up with a continuum of image subelements in each vertical element of the stereo picture. This is illustrated in FIG. 3 which corresponds to FIG. 1 but which has such a continuum made up of subelements 30 behind each vertical slit of the azimuth defining device. Light from one subelement passes as indicated by arrow 31 to the right eye while light from another element as indicated by arrow 32 passes to the left eye. Thus the observer sees a stereo image. If the film is tilted very slightly or if the observer moves his head to one side, a different pair of subelements may be seen. For example, the arrow 32 may go to the right eye of the observer and in this case light indicated by the broken arrow 33 goes to the left eye. As is well known, the optical illusion thus obtained gives the effect of actually moving the head relative to the original subject. The observer "looks around" objects in the apparent foreground of the picture. This is the system sometimes referred to as autostereo.

Figure 4:
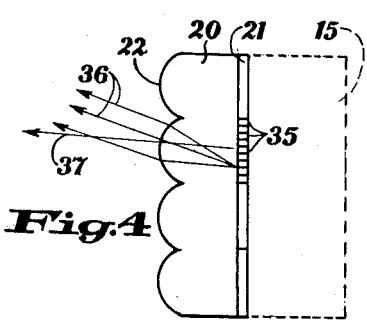

The same autostereo effect can be obtained with lenticular film as illustrated in FIG. 4. In this case the subelements of the picture are indicated at 35. Light from one of the subelements is collimated into rays 36 heading parallel in one direction, while light from a different subelement is similarly collimated and headed in a different direction, one ray of which is shown at 37.

It is known that the pictures for slit type viewing as illustrated in FIGS. 1 and 3 may be prepared photographically by exposure through the same or similar slits and the pictures for lenticular viewing as in FIGS. 2 and 4 may also be prepared with lenticular film. In some cases the film used in the camera is actually that used for viewing. Alternatively either picture taking system may be used to produce the pictures for the other type of viewing system. This requires care in registration of the final picture so that the stereo elements are lined up with the azimuth defining member (slit or lenticule) and more or less centered behind the slit or lenticule. Exact registration is not critical, but the picture elements and the slits or lenticules must be fully parallel and there should be exactly the same number of slits as there are elements across the picture. If there are one or two more picture elements than there are slits or lenticules, one or two changeovers between orthostereo and pseudostereo appear to the viewer, within the total width of the print. It is customary, therefore, to have the proper number of picture elements and strict parallelism of the picture elements and the viewing elements, the latter being more or less accurately centered over the picture elements.

One of the most satisfactory systems when the viewing means is different from the taking means, employs the slit system for taking the picture and the lenticular system for viewing it. The lenticular system works at much higher aperture and hence the picture appears brighter than with the slit system when viewing. On the other hand, the slit system can be selected for any desired resolution. For example the slit may be only $\frac{1}{15}$ the width of the whole element, i.e., $\frac{1}{15}$ the width of the opaque areas between slits. The net result is that the information stored in the image represents or can be resolved into about 15 different angles of view in the systems shown in FIGS. 3 and 4, for example. This high resolution is highly desirable. The same number of elements can be prepared photographically through a lenticular screen but the resolution is often not as good. Furthermore, the effect of the slits toward the edge of the picture or field and toward the top and bottom of the picture tends to remain uniform, whereas there is sometimes a blurring of the edges of the picture when taken through the lenticular film. This is due in part to the larger effective aperture of the lenticules compared to the slits.

The present invention finds its direct and greatest application in those forms of stereo reproduction in which the image is first printed on a white support such as 15 and then coated with the transparent layer corresponding to 19 or 20 in FIGS. 1 to 4. Subsequent to the coating operation, lines or preferably lenticules are produced in the surface of the coating in register with the stereo elements printed on the paper and lying at the bottom of the coating. If the stereo picture printed on the paper is a continuous photographic one, there is no need for the present invention. However when a large number of prints are required and photographic printing is not economical, it is customary (as in the printing of magazines, newspapers and the like) to use photoengraving, photolithography or photogravure. Although some forms of gravure printing are not halftone in the sense that the areas of the elements vary, other forms of gravure are halftone and all forms of photoengraving and photolithography employ halftone screening in one form or another. The present invention involves halftones. The usual form of halftone element is a dot.

Figure 5:
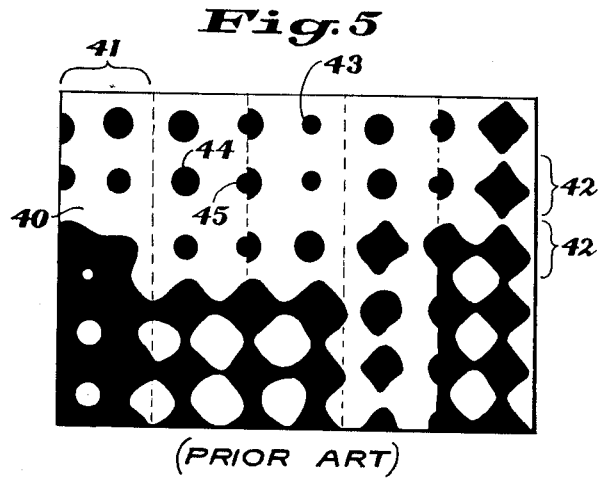
FIGS. 5, 6 and 7 are enlarged views of details of halftone prints for use with line stereo pictures according to the invention.

FIG. 5 illustrates one form of the prior art in which dot halftone images are first printed and then the lenticules are registered therewith. In FIG. 5 the image consisting of halftone dots is printed on a paper support 40. The screening in this particular embodiment is horizontal and vertical, the width of the dot elements being indicated at 42. Highlight dots such as 43 are small black dots on a white background and shadow dots are clear areas at the corners of the dot elements. The lenticules whose width is indicated at 41 are oriented vertically of course to give the stereo effect. The picture element viewed by the left eye should be to the right of the picture element viewed by the right eye, behind each lenticule, thus the small dot 45 may be a subelement of a left eye element and the relatively larger dot 44 will be a subelement of a right eye element. Since the dot width 42 is almost as large as the lenticule width 41, the stereo discrimination is not large. Obviously it is not possible with such large halftone elements, to give a continuum of image variations behind each lenticule. Some stereo effect is obtained however with such an arrangement and the effect improves as smaller or finer halftone dots are employed.

Figure 6:
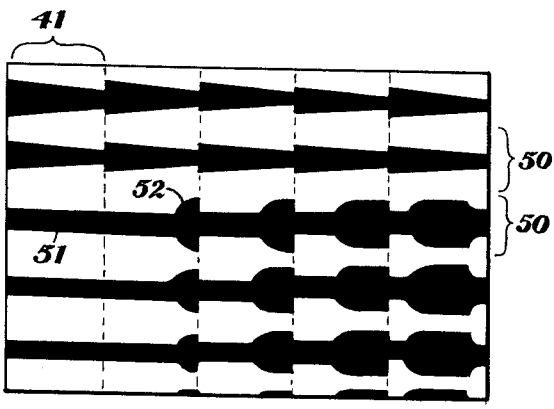

According to the present invention as illustrated in FIG. 6, line halftones are used for printing the image. The width of the line elements indicated at 50 is the same as in FIG. 5, i.e., only slightly smaller than the width of the lenticules 41. However, variations along each line are resolved into much smaller elements. The line 51 for example is of uniform width for the full width 41 of one lenticule but behind successive lenticules, this particular halftone line is wider at the right. It is illustrated as having the wide part of the line extend further across each lenticule as one proceeds to the right in the picture.

Figure 7:
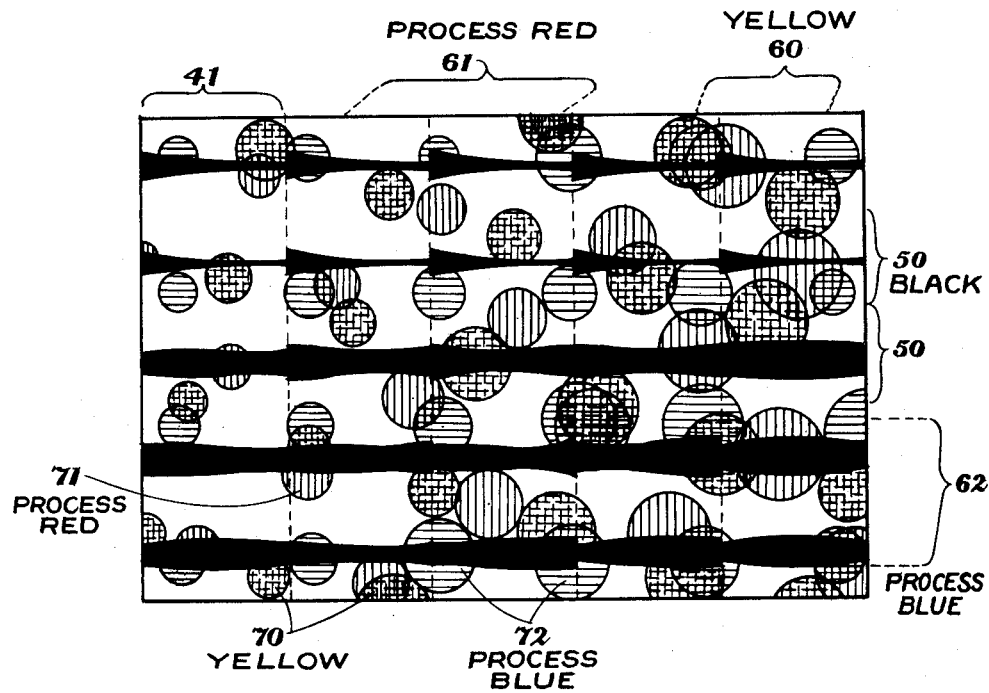

It should be realized that the whole of FIGS. 5, 6 or 7 merely illustrates the lightness and darkness of a small portion of an image and that details of the subject itself cannot be identified in such small portion of the picture. For example, the lenticular element width 41 may be about 1/50 inch and the halftone element width 50 may be about 1/100 inch, so that FIG. 6 is a magnified view of a portion only .05 by .025 inch. Hence one detail of the picture would pretty well fill the whole of FIG. 6. Excellent resolution is obtained with the line halftone approximately at right angles to the light azimuth defining elements. The angle between the two systems, i.e., between the vertical viewing elements and the approximately horizontal halftone lines need not be exactly 90°, but it should probably be greater than 45° to insure best halftone resolution. Whatever angle is selected, the line width variations representing the stereo discrimination, must each occupy the width of a lenticule and the lenticules must be registered with these variations.

When the present invention is applied to color photography, each of the magenta, cyan and yellow prints may be made in line halftone. If a black printer is also used, it may similarly be in line halftone. However, the preferred embodiment of the invention has the stereo discrimination confined to the black printer. In this case, the magenta, cyan and yellow printers may be either line halftone or dot halftone.

One of the most preferred embodiments of the invention is illustrated in FIG. 7 in which the black printer is a line halftone and contains all of the stereo information. The magenta, cyan and yellow separations contain no stereo information and are printed in dot halftone. Furthermore the screening of the color prints is not as fine as the black print. The black print has an element width 50 slightly smaller than the width 41 of the stereo lenticules. The yellow print made up of dots 70 has the screening set at an angle and the element width indicated at 60. The magenta print made up of dot 71 has the screening set at a different angle and the width being indicated at 61. The cyan or "process blue" print made up of dots 72 has the screening horizontal and vertical, the angle and width being indicated at 62. The widths 60, 61, 62, are slightly greater than the width 50 and slightly less than the width 41 of the lenticules. FIG. 7 necessarily appears jumbled since the details of any four-color print appear quite confused at such high magnification. The four-color print thus illustrated has stereo discrimination or stereo information as well as black printer information in the black print. The results obtained with such a system are excellent, far superior to anything obtained by any prior system The invention has been described in detail with particular reference to preferred embodiments thereof, but it will be understood that variations and modifications can be effected within the spirit and scope of the invention as described hereinabove and as defined in the appended claims.

We claim:
1. A product comprising a flat support sheet, a line halftone print with approximately horizontal halftone lines on one surface of the sheet, a transparent layer overlying the print with light azimuth defining viewing elements vertically oriented on the front surface of the layer, said print containing behind individual viewing elements, halftone line width variations in image density corresponding to binocular stereo distinctions which line halftone print is the black print of a four color print.

2. A product according to claim 1 in which in register with the black print are dot halftone color separation magenta, yellow and cyan prints of the same subject.

3. A product according to claim 1 in which in register with the black print are color separation magenta, yellow and cyan prints representing one viewpoint azimuth only.

4. A product according to claim 1 in which in register with the black print are dot halftone color separation magenta, yellow and cyan prints of the same subject representing one viewpoint azimuth only.

5. The method of producing a color stereo print which comprises printing yellow, magenta and cyan separation halftone prints in subject register on a sheet of paper, then printing a black separation horizontal line, line halftone, print in similar subject register therewith, the black print consisting of narrow vertical sections having in each section variations in line width from left to right of the section corresponding to right and left eye stereo distinctions, then coating the surfaces with a transparent plastic and producing on the front of the coating, a light azimuth defining viewing element in front of each vertical section of the black print.

6. The method according to claim 5 in which the variations in line width behind each section of the black print correspond to a continuum of stereo separations.

7. The method according to claim 5 in which the light azimuth defining viewing elements are cylindrical lenticules produced by molding the front surface of the plastic coating.

8. A product comprising:
  a support sheet,
  a halftone substantially natural color print of at least three color separations on a surface of said sheet,
  a transparent layer overlying said print, with light azimuth defining viewing elements vertically oriented on the front surface of said layer,
  said halftone print containing the darkest of the color separations approximately horizontal halftone lines, said lines containing behind individual viewing elements variations in width corresponding to binocular stereo distinctions, and
  said halftone print containing in the color separations other than said darkest one, halftones representing one viewpoint azimuth only.

9. A product according to claim 8 in which in register with said darkest color halftone lines are dot halftones of the other color separations of the print.

10. A product according to claim 8 in which the halftone print contains four color separations and the approximately horizontal halftone lines are black.

11. A product according to claim 10 in which in register with the black color halftone lines are dot halftones of the other color separations of the print.

12. A product according to claim 10 in which the light azimuth defining viewing elements are approximately cylindrical lenticules.

13. A product according to claim 8 in which said variations in width behind each viewing element correspond to at least three viewing azimuths.

References Cited in the file of this patent

UNITED STATES PATENTS

| | | |
|---|---|---|
| 1,882,424 | Ives | Oct. 11, 1932 |
| 1,989,553 | Kanolt | Jan. 29, 1935 |
| 2,151,301 | Percy et al. | Mar. 21, 1939 |
| 2,279,825 | Kaszab | Apr. 14, 1942 |
| 2,785,976 | Ogle | Mar. 19, 1957 |
| 2,914,407 | Meyer | Nov. 24, 1959 |
| 3,010,389 | Buskes | Nov. 28, 1961 |

UNITED STATES PATENT OFFICE
CERTIFICATE OF CORRECTION

Patent No. 3,161,509                      December 15, 1964

Donald J. Howe et al.

It is hereby certified that error appears in the above numbered patent requiring correction and that the said Letters Patent should read as corrected below.

Column 7, line 19, after "containing" insert -- in --.

Signed and sealed this 3rd day of August 1965.

(SEAL)
Attest:

ERNEST W. SWIDER                      EDWARD J. BRENNER
Attesting Officer                      Commissioner of Patents